Figure 1:
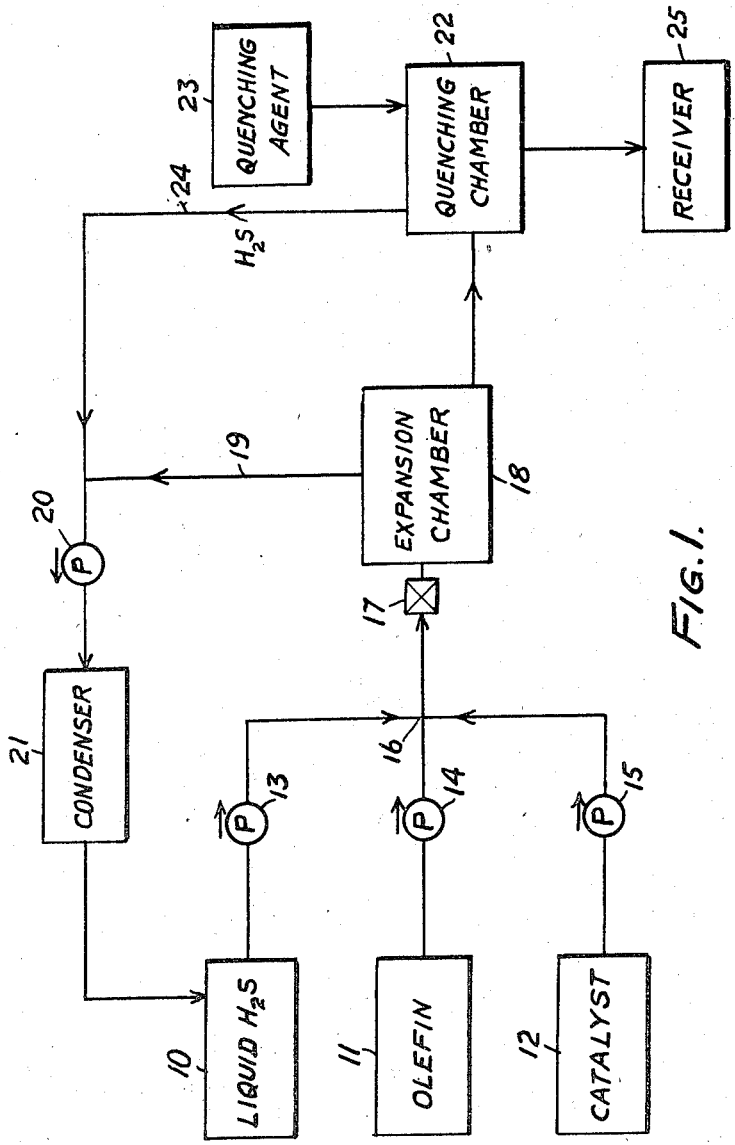

June 22, 1948.                J. L. EATON ET AL                2,443,852
                       CONDENSATION OF OLEFINIC COMPOUNDS
                              WITH HYDROGEN SULFIDE
Filed Aug. 22, 1944                                        2 Sheets-Sheet 2

WITNESS:

INVENTORS
John L. Eaton &
John F. Olin
BY Maurice A. Crews
ATTORNEY.

Patented June 22, 1948

2,443,852

UNITED STATES PATENT OFFICE 2,443,852

CONDENSATION OF OLEFINIC COMPOUNDS WITH HYDROGEN SULFIDE

John L. Eaton, Trenton, and John F. Olin, Grosse Ile, Mich., assignors to Sharples Chemicals Inc., Philadelphia, Pa., a corporation of Delaware Application August 22, 1944, Serial No. 550,630

10 Claims. (Cl. 260—609)

1

The present invention pertains to manufacture of mercaptans and thioethers by condensation of hydrogen sulfide with olefinic compounds. It is a continuation in part of our copending applications Serial No. 472,946, filed January 20, 1932, now Patent 2,434,510, Serial No. 534,354, now abandoned, filed May 5, 1944, and Serial No. 534,355, now abandoned, filed May 5, 1944, each entitled Condensation of olefinic compounds with hydrogen sulfide.

Each of the above-mentioned patent applications teaches one or more important improvements in the art of condensing olefins with hydrogen sulfide to form mercaptans and/or thioethers. The features involved in these applications include the use of very low temperatures as compared to comparable processes of the prior art, to use of catalysts which are unusually effective, to condensation with hydrogen sulfide of olefins which have not heretofore been condensed successfully with hydrogen sulfide to form sulfur-containing compounds of corresponding carbon content, and to features by which operating economies and improved yields of products may be attained. The present invention provides important features by which still further advantages by way of operating economies and yield of products are made available.

This invention was conceived and perfected in connection with research designed to provide an improved process for condensing hydrogen sulfide with olefins containing between 8 and 20 carbon atoms, and more particularly with olefins of this type formed by polymerization of lower olefins. It will accordingly be described with primary reference to that problem. It should be understood, however, that the invention is broader than might be inferred from this specific description, as it may be practiced in condensing any olefin containing at least three carbon atoms with hydrogen sulfide. The advantages of the invention in treatment of olefins containing between 3 and 7 carbon atoms are not so great as those in treatment of olefins within the range of 8 to 20 carbon atoms, since the reaction rates of these lower olefins with hydrogen sulfide are slower than those of the higher olefins at the unusually low temperatures achieved by the features of this invention. It should be distinctly understood, however, that the invention is applicable to treatment of all olefins containing between 3 and 20 carbon atoms and also to olefins of even higher carbon content. The invention is applicable to treatment of open chain olefins, cycloaliphatic olefins and olefins containing substituents of an aromatic nature. It may, for example, be applied in condensation of styrene with hydrogen sulfide.

As taught in our co-pending applications Serial Nos. 534,354 and 534,355, we have discovered that use of very low temperatures in condensation of olefins with hydrogen sulfide causes a shift of equilibrium conditions to the right in practice of the sulfhydration reaction, and that both yields and conversions may be considerably improved, as compared to those attainable by prior art practice, by use of temperatures considered by those skilled in the art to be sensationally low, provided other appropriate conditions are observed in practice of this low temperature technique.

In the practice of the present invention, the olefinic compound is first contacted with liquid hydrogen sulfide under super-atmospheric pressure to obtain intimate contact between these reactants, and excess hydrogen sulfide is thereafter vaporized from the reaction mixture by a reduction of the pressure. The reaction is thus initiated by the liquid phase contact between the olefinic compound and the hydrogen sulfide, and it is carried still further to the right by the reduction in temperature caused by self refrigeration of the reaction mixture incident to removal of the excess hydrogen sulfide.

In the practice of the invention in accordance with the preferred embodiment, we employ an active catalyst of a type known to promote the sulfhydration reaction. While the catalyst may be chosen from among the various catalysts which have heretofore been used for this type of condensation, we recommend use of one of the catalysts taught by our co-pending applications discussed above, such as boron fluoride, hydrogen fluoride, aluminum chloride, zinc chloride, ferric chloride, boron chloride, phosphorus pentafluoride, arsenic trifluoride, stannic chloride, titanium tetrachloride, antimony pentafluoride, beryllium chloride. The catalysts which have been found to be most effective have been boron fluoride, hydrogen fluoride, and particularly mixtures of these two catalysts as taught in the co-pending application of John B. Fenn and John L. Eaton, Serial No. 516,245, filed December 30, 1943.

It is somewhat surprising that the reaction can be effectively shifted to the right by evaporation of hydrogen sulfide from a reaction mixture derived from use of these very volatile catalysts, since it might be anticipated that certain catalysts would be removed from the reaction mixture, upon reduction of pressure, at a rate greater than the hydrogen sulfide. The removal of the hydrogen sulfide itself has a tendency to shift the equilibrium to the left in accordance with the principles of the law of mass action, but this is offset by providing in the initial reaction mixture a sufficient excess of hydrogen sulfide, over that expected to enter into the condensation reaction, to maintain in the reaction mixture after self refrigeration by removal of a part of the hydrogen sulfide, a sufficient quantity of residual hydrogen sulfide to maintain the desired conversion.

As an illustration of the practice of the invention in a batch reactor in condensation of an olefin containing between 8 and 20 carbon atoms with hydorgen sulfide, the following detailed conditions of operation may be followed. The olefin and hydrogen sulfide are pumped into a reactor maintained under super-atmospheric pressure to insure that the hydrogen sulfide is maintained in the liquid phase, at least at the start of the reaction. A suitable catalyst, such as boron fluoride, hydrogen fluoride or a mixture of these two, is also pumped into the reaction chamber. After the reactants have been contacted in the liquid phase, and preferably after this liquid phase contact has been maintained for some minutes at a temperature in the neighborhood of 0° C. or below, the reaction chamber is subjected to a much lower pressure, either by venting hydrogen sulfide therefrom or pumping the hydrogen sulfide vapor from the remaining reaction mixture. This vaporization of the hydrogen sulfide causes a sudden lowering of temperature of the remaining reaction mixture, with the result that a further quantity of the hydrogen sulfide remaining in the reaction mixture is condensed with the olefin to improve the degree of conversion to the desired mercaptan. In the practice of such a process, it is desirable that a large stoichiometric excess of hydrogen sulfide be provided, and best operation in practice of the invention involves use of a molecular ratio of at least 5:1 of hydrogen sulfide to the olefin under treatment.

In the preferred practice of the invention, the condensation reaction is accomplished during continuous flow of the reactants and catalysts through a reactor and expansion chamber to effect first a certain amount of reaction between the olefin and hydrogen sulfide and thereafter to achieve further reaction during the expansion period. Such an operation is illustrated in two separate embodiments on the attached flow sheet, in which, Figure 1 illustrates practice of the process by a procedure in which the reaction mixture is passed directly through the steps of the process, and Figure 2 illustrates an embodiment in which the expansion chamber surrounds the original reaction zone to provide preliminary cooling of the reaction mixture before it reaches the expansion zone.

Figure 2:
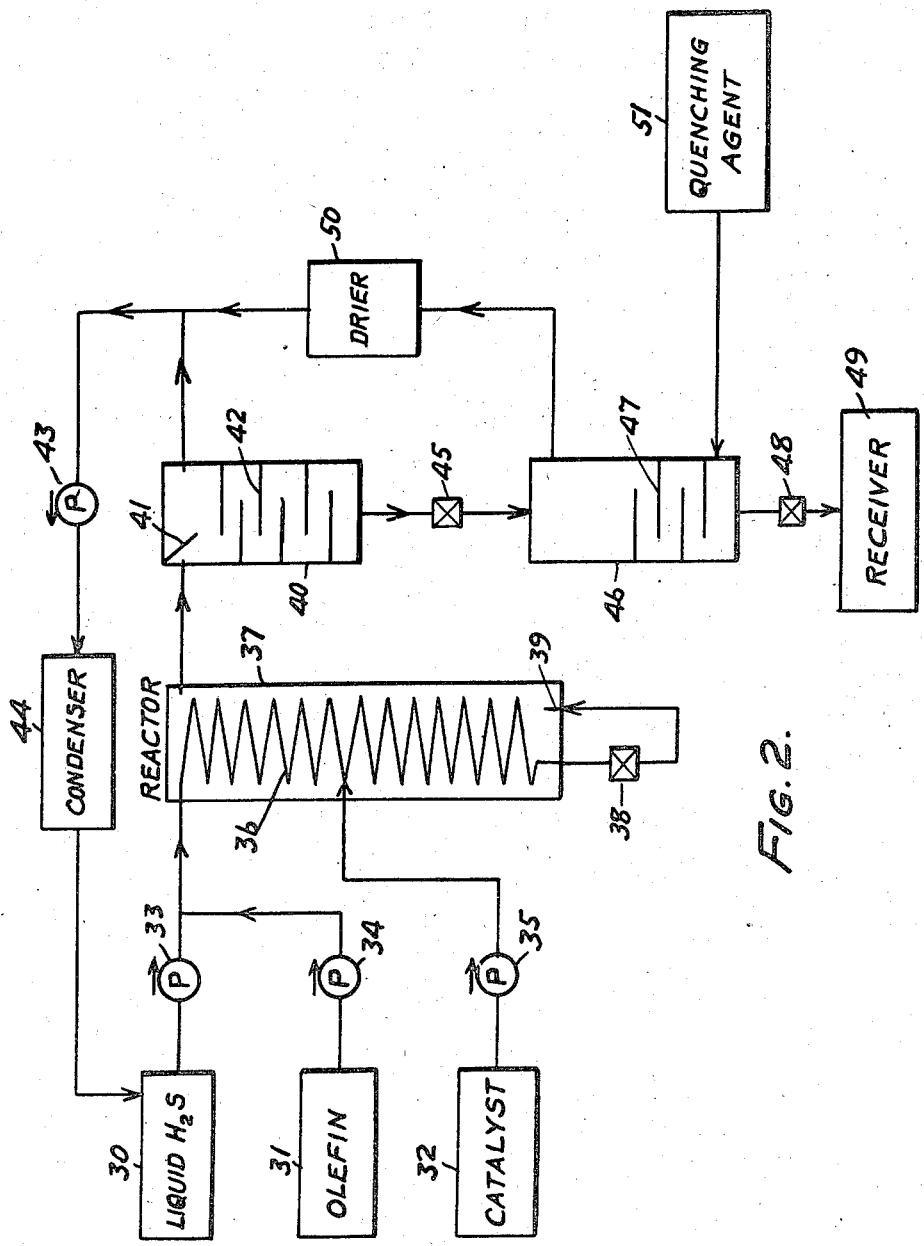

Referring to the drawing by reference characters, in the embodiment of Figure 1, the liquid hydrogen sulfide from container 10 is pumped by pump 13 into confluence with liquid olefin from container 11 and catalyst from container 12, which are pumped by pumps 14 and 15 respectively, the three streams joining at 16 and being passed thence through an expansion valve 17 into an expansion chamber 18. After passage through expansion valve 17, the hydrogen sulfide will be vaporized and escape from expansion chamber 18 through conduit 19 to pump 20 by which this hydrogen sulfide is passed through condenser 21 to the container 10 for recycling through the process in treatment of further quantities of olefin.

In the treatment of olefins containing from 8 to 20 carbon atoms in a process such as that described above, the liquids in containers 10, 11 and 12 and in the conduits connecting these containers with expansion chamber 18 will ordinarily be maintained at a very low temperature, usually below 0° C. Even in the treatment of the lower olefins, the temperatures maintained in these portions of the process will be at least as low as 30° C., sufficient pressure being maintained in any case to maintain all of the constituents entering into the practice of the process in the liquid phase until the hydrogen sulfide is vaporized by passage through the valve 17. In case a volatile halide catalyst such as boron fluoride or hydrogen fluoride is used, a part of the catalyst will be removed from the expansion chamber 18 together with the hydrogen sulfide through conduit 19, but these compounds are sufficiently soluble in the olefin under treatment and in the mercaptan or dialkyl sulfide formed by the reaction to maintain a substantial quantity of the halide catalyst in the reaction mixture even after the temperature of that mixture has been lowered by evaporation of a part of the hydrogen sulfide of the mixture.

There will be a preliminary reaction between the olefin and the hydrogen sulfide immediately upon contact between these reactants at the zone 16, the extent of this reaction being dependent largely upon the temperature and upon the reactivity of the particular olefin under treatment under the catalytic effect of the particular catalyst being used. With the preferred boron fluoride and hydrogen fluoride catalysts, the reaction will be very rapid.

After the reaction has been initiated between the zone of confluence 16 and the expansion valve 17, it proceeds further to the right upon cooling of the reaction mixture by evaporation of the hydrogen sulfide.

The reaction mixture, which may be cooled to a temperature as low as —60° C. by passage through the expansion chamber 18, is next passed to a container 22 where it is treated with a quenching agent from container 23 for destroying the catalytic effect of the catalyst used in the reaction. Further hydrogen sulfide may be vented from the quenching chamber 22 and returned to the reaction through conduit 24, being pumped, together with hydrogen sulfide from expansion chamber 18, by pump 20 through condenser 21 to the container 10. As the quenching agent for destroying the effect of the catalyst, any one of the substances discussed in the copending application of John L. Eaton and John B. Fenn, Serial No. 516,244, filed December 30, 1943, may be used. Water containing a substantial amount of an electrolyte to lower its freezing point constitutes an excellent quenching agent, and it is preferable that this agent be added at a time when the reaction mixture is still at a very low temperature due to the self refrigeration.

Figure 2 of the drawing illustrates an embodiment of the invention in which still further advantages are attained by use of the refrigerating effect of the vaporizing hydrogen sulfide to cool the reaction mixture before it reaches the point of the process at which the hydrogen sulfide is vaporized. As there illustrated, liquid hydrogen sulfide from container 30 and olefin from container 31 are fed into confluence by pumps 33 and 34, respectively, are passed thence through a reaction coil 36. Catalyst from container 32 is similarly pumped to this reaction coil by pump 35, and the reaction proceeds during descent of the reaction mixture in liquid phase through the coil 36, which is surrounded by shell 37. After passing from the bottom of the coil 36, the reaction mixture passes through an expansion valve 38 and the hydrogen sulfide is vaporized as the mixture passes through conduit 39 to the portion of the shell 37 surrounding the coil 36. The temperature of the reaction mixture released into the shell 37 is sharply lowered due to vaporization of hydrogen sulfide, and as the mixture of liquid and vapors passes upwardly through the shell 37, this mixture cools the following portion of the reaction mixture which is descending through the coil 36. The reaction toward the right is thus promoted by the cooling of the mixture as it descends through coil 36, and it is still further promoted by the further cooling effected upon release of the hydrogen sulfide into the shell 37, with conversion of a part of this hydrogen sulfide into a vapor.

The mixture of liquid and vapors, after passing upwardly through shell 37, is passed to separator 40, which is provided with baffles 41 and 42 for directing the flow of the reaction mixture and insuring separation of a substantial portion of the hydrogen sulfide, in the form of a vapor, upwardly from this separating chamber. The released hydrogen sulfide is passed by pump 43 through condenser 44 back to the container 30, whence it may be recycled through the system. The liquid reaction mixture descending through separator 40 is passed through valve 45 into quenching chamber 46, which is provided with baffles 47 and with an inlet for quenching fluid from container 51. The reaction mixture from container 46 may be passed through valve 48 to receiver 49 while hydrogen sulfide vapor from quenching chamber 46, which may have picked up some water from the quenching agent, is suitably passed through dryer 50 before joining the recycle hydrogen sulfide from separator 40.

*Example I*

Pre-cooled tri-isobutylene and liquid hydrogen sulfide in the ratio of 1:2 by weight were caused to pass through a one inch steel coil together with 1.7% by weight of boron fluoride, the temperature of the reaction mixture in the coil being held at approximately −30° C. by refrigeration supplied by a dry ice methanol bath. The main part of the reaction mixture was discharged directly into an aqueous alkaline solution constituting a quenching bath, and the oil obtained from this reaction mixture contained 78% mercaptan. At intervals during this operation, a side stream of material from the coil, instead of being passed directly to the quenching step, was released into a dry flask and maintained in this flask for a period of approximately 3 minutes before being quenched by treatment with a basic solution. The oily product from this operation in which the side stream was cooled to a temperature of approximately −60° C. by self refrigeration attained by evaporation of a part of the hydrogen sulfide was found to contain approximately 96% tertiary dodecyl mercaptan as compared with the 78% obtained when this self refrigeration step was omitted. It will thus be seen that, by the two operations performed in this example, we demonstrated that the conversion could be very materially improved by super-imposition of the self refrigeration step upon an operation which was otherwise unchanged.

*Example II*

In a pilot plant like that illustrated in Figure 2 of the attached flow sheet, tri-isobutylene, hydrogen sulfide and boron fluoride were introduced continuously in the weight ratio of 100:200:5 at such a rate that the average period of passage through the coil reactor was one minute and through the surrounding shell was five minutes. The temperature at the discharge end of the coil was about −25° C. and the temperature in the shell was −50° C. The average conversion to tertiary dodecyl mercaptan during a three hour period of this operation was 90%.

Various modifications are possible within the scope of the invention, and we do not therefore wish to be limited except by the scope of the following claims.

We claim:

1. In the manufacture of mercaptans and thioethers, the process comprising condensing an olefin polymer having between 8 and 20 carbon atoms with hydrogen sulfide present in molecular excess in liquid phase under super-atmospheric pressure in the presence of a catalyst, and reducing the pressure on the reaction mixture, and thereby vaporizing a part of the excess hydrogen sulfide and lowering the temperature of the reaction mixture while maintaining at least a portion of said catalyst in the reaction mixture, whereby an increased conversion to the desired product is obtained, said catalyst being selected from the group consisting of boron fluoride, hydrogen fluoride, aluminum chloride, zinc chloride, ferric chloride, boron chloride, phosphorus pentafluoride, arsenic trifluoride, stannic chloride, titanium tetrachloride, antimony pentafluoride and beryllium chloride.

2. In the manufacture of mercaptans and thioethers, the process comprising condensing an open chain olefin polymer having between 8 and 20 carbon atoms with hydrogen sulfide in molecular excess in liquid phase under super-atmospheric pressure in the presence of a boron fluoride catalyst, and reducing the pressure on the reaction mixture, and thereby vaporizing a part of the excess hydrogen sulfide and lowering the temperature of the reaction mixture while maintaining at least a part of said boron fluoride catalyst in the reaction mixture, whereby an increased conversion to the desired product is obtained.

3. In the manufacture of mercaptans and thioethers, the process comprising condensing an open chain olefin polymer having between 8 and 20 carbon atoms with hydrogen sulfide present in molecular excess in liquid phase under super-atmospheric pressure in the presence of a hydrogen fluoride catalyst, and reducing the pressure on the reaction mixture, and thereby vaporizing a part of the excess hydrogen sulfide and lowering the temperature of the reaction mixture while maintaining at least a part of said hydrogen fluoride catalyst in the reaction mixture, whereby an increased conversion to the desired product is obtained.

4. In the manufacture of mercaptans and thioethers, the process comprising condensing an open chain olefin polymer having between 8 and 20 carbon atoms with hydrogen sulfide present in molecular excess in liquid phase under super-atmospheric pressure in the presence of a catalyst comprising both hydrogen fluoride and boron trifluoride, and reducing the pressure on the reaction mixture, and thereby vaporizing a part of the excess hydrogen sulfide and lowering the temperature of the reaction mixture while maintaining at least a part of said catalyst in the reaction mixture, whereby an increased conversion to the desired product is obtained.

5. In the manufacture of mercaptans and thioethers, the process comprising continuously passing an open chain olefin polymer having between 8 and 20 carbon atoms with hydrogen sulfide present in molecular excess in liquid phase together with a catalyst through a reaction chamber under superatmospheric pressure, and passing the resulting reaction mixture continuously together with said catalyst into a zone of reduced pressure, and thereby vaporizing a part of the excess hydrogen sulfide and lowering the temperature of the reaction mixture, whereby an increased conversion to the desired product is obtained, said catalyst being selected from the group consisting of boron fluoride, hydrogen fluoride, aluminum chloride, zinc chloride, ferric chloride, boron chloride, phosphorus pentafluoride, arsenic trifluoride, stannic chloride, titanium tetrachloride, antimony pentafluoride and beryllium chloride.

6. In the manufacture of mercaptans and thioethers, the process comprising condensing an open chain olefin polymer having between 8 and 20 carbon atoms with hydrogen sulfide present in molecular excess in liquid phase under superatmospheric pressure in the presence of a catalyst, and reducing the pressure on the reaction mixture, and thereby vaporizing a part of the excess hydrogen sulfide and lowering the temperature of the reaction mixture while maintaining said reaction mixture in contact with said catalyst, whereby increased conversion to the desired product is obtained, said catalyst being selected from the group consisting of boron fluoride, hydrogen fluoride, aluminum chloride, zinc chloride, ferric chloride, boron chloride, phosphorus pentafluoride, arsenic trifluoride, stannic chloride, titanium tetrachloride, antimony pentafluoride and beryllium chloride.

7. A process as defined in claim 2, in which the olefin polymer, hydrogen sulfide and boron fluoride are passed continuously through a reaction chamber under superatmospheric pressure, and thereafter passed to a zone of reduced pressure to cause vaporization of excess hydrogen sulfide and increase in conversion.

8. A process as defined in claim 3, in which the olefin polymer, hydrogen sulfide and hydrogen fluoride are passed continuously through a reaction chamber under superatmospheric pressure, and thereafter passed to a zone of reduced pressure to cause vaporization of excess hydrogen sulfide and increase in conversion.

9. A process as defined in claim 4, in which the olefin polymer, hydrogen sulfide, hydrogen fluoride and boron trifluoride are passed continuously through a reaction chamber under superatmospheric pressure, and thereafter passed to a zone of reduced pressure to cause vaporization of excess hydrogen sulfide and increase in conversion.

10. The process of claim 1 in which the olefin polymer employed is tri-isobutylene.

JOHN L. EATON.
JOHN F. OLIN.

REFERENCES CITED

The following references are of record in the file of this patent:

UNITED STATES PATENTS

| Number | Name | Date |
|---|---|---|
| 1,836,170 | Johansen | Dec. 15, 1931 |
| 1,836,171 | Johansen | Dec. 15, 1931 |
| 2,051,807 | Allen | Aug. 25, 1936 |
| 2,052,210 | Borglin | Aug. 25, 1936 |
| 2,052,268 | William | Aug. 25, 1936 |
| 2,061,018 | Carruthers | Nov. 17, 1936 |
| 2,137,584 | Ott | Nov. 22, 1938 |
| 2,252,138 | Rutherford | Aug. 12, 1941 |
| 2,296,399 | Otto | Sept. 22, 1942 |
| 2,352,435 | Hoeffelman | June 27, 1944 |